(12) United States Patent
Matsunaga (10) Patent No.: US 8,711,230 B2
(45) Date of Patent: Apr. 29, 2014

(54) IMAGE CAPTURE APPARATUS AND PROGRAM

(75) Inventor: Kazuhisa Matsunaga, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 283 days.

(21) Appl. No.: 12/424,769

(22) Filed: Apr. 16, 2009

(65) Prior Publication Data

US 2009/0284609 A1 Nov. 19, 2009

(30) Foreign Application Priority Data

May 16, 2008 (JP) ................................. 2008-128987
Feb. 10, 2009 (JP) ................................. 2009-027968

(51) Int. Cl.
*H04N 5/228* (2006.01)
*G03B 17/00* (2006.01)

(52) U.S. Cl.
USPC ........................................ 348/208.13; 396/55

(58) Field of Classification Search
USPC ................. 348/208.99, 208.1, 208.6, 208.12, 348/208.11, 208.4, 208.13, 208.5, 36–39, 348/218.1, 362, 221.1; 396/55
See application file for complete search history.

(56) References Cited

U.S. PATENT DOCUMENTS

| | | | | |
|---|---|---|---|---|
| 7,239,342 B2 * | 7/2007 | Kingetsu et al. | ........... | 348/208.4 |
| 7,664,382 B2 * | 2/2010 | Yamasaki | ........... | 396/55 |
| 7,769,282 B2 | 8/2010 | Kimura | | |
| 8,009,971 B2 * | 8/2011 | Koo et al. | ........... | 396/55 |
| 8,023,811 B2 | 9/2011 | Kimura | | |
| 8,068,138 B2 | 11/2011 | Wakagi et al. | | |
| 8,311,367 B2 | 11/2012 | Murashita et al. | | |
| 2007/0212044 A1 * | 9/2007 | Yamasaki | ........... | 396/55 |
| 2007/0257989 A1 | 11/2007 | Shirono | | |
| 2008/0094481 A1 * | 4/2008 | Rai | ........... | 348/222.1 |
| 2008/0152332 A1 * | 6/2008 | Koo et al. | ........... | 396/55 |

FOREIGN PATENT DOCUMENTS

| | | |
|---|---|---|
| CN | 101067709 A | 11/2007 |
| JP | 6-141242 A | 5/1994 |
| JP | 2002-027300 A | 1/2002 |
| JP | 2004-072371 A | 3/2004 |

(Continued)

OTHER PUBLICATIONS

Chinese Office Action dated Sep. 13, 2010 (and English translation thereof) in counterpart Chinese Application No. 200910139075.7.

(Continued)

*Primary Examiner* — Ahmed A Berhan
(74) *Attorney, Agent, or Firm* — Holtz, Holtz, Goodman & Chick (57) ABSTRACT

An image capture apparatus shifts an image sensor at each shooting initiation time in the continuous-shoot mode in the event of a camera-shake in response to a control signal which reflects an offset signal indicating pixel shifting information in a compensating signal indicating shake compensating information. Thereby, a change in the shooting range of the image sensor due to the camera-shake is mostly compensated for and the shooting range is changed by one pixel at each shooting. Thus, even in the event of a camera-shake, the distance between a feature portion of a main subject and a fixed pattern noise can be made different for each of continuously shot images. As a result, even in the event of the camera-shake, a composite image having fixed pattern noises scattered can be obtained by combining continuously shot images with reference to the feature portion.

10 Claims, 8 Drawing Sheets

(56) References Cited

FOREIGN PATENT DOCUMENTS

| JP | 2004-343483 A | 12/2004 |
| JP | 2007-081682 A | 3/2007 |
| JP | 2007-178708 A | 7/2007 |
| JP | 2007-214662 A | 8/2007 |
| JP | 2007-323030 A | 12/2007 |
| JP | 2009-124661 A | 6/2009 |
| WO | WO 2008/032392 A1 | 3/2008 |

OTHER PUBLICATIONS

Japanese Office Action dated Jun. 25, 2013 (and English translation thereof) in counterpart Japanese Application No. 2011-281463.
Japanese Office Action dated Feb. 12, 2013(and English translation thereof) in counterpart Japanese Application No. 2011-281463.

* cited by examiner

IMAGE CAPTURE APPARATUS AND PROGRAM

CROSS-REFERENCE TO RELATED APPLICATIONS

This application is based upon and claims the benefit of priority from prior Japanese Patent Applications No. 2008-128987, filed May 16, 2008; and No. 2009-027968, filed Feb. 10, 2009, the entire contents of both of which are incorporated herein by reference.

BACKGROUND OF THE INVENTION

1. Field of the Invention

The present invention relates to an image capture apparatus using a solid-state image sensor.

2. Description of the Related Art

In conventional image capture apparatuses using a solid-state image sensor, an image signal output from the image sensor and pulses for driving the image sensor are generated in circuitry. In addition, various pulses for signal processing are mixed in the image sensor. These pulses are produced from a common reference clock signal and are frequently synchronized with one another. If high-frequency components of such synchronized signals are mixed in with the image signal through capacitive coupling between wiring patterns or the like in the apparatus, then visible line- or point-like fixed pattern noise will occur on the image based on the image signal. This fixed pattern noise may cause degradation of image quality.

Accordingly, an image capture apparatus has been proposed which is adapted to, at the time of continuous shooting, capture a series of images which are displaced relative to one another in position of the same subject by a predetermined amount by rotating a mirror that transmits a subject image to a two-dimensional photo-sensor in uniform angular steps and then combine the captured images with reference to a specific subject image on each captured image to create a composite image (see, for example, Jpn. Pat. Appln. KOKAI Publication No. 2007-214662).

According to this conventional image capture apparatus, the rotation of the mirror causes the positional relationship between the particular subject image as the reference for combining the captured images and the fixed pattern noise to vary for each captured image. Therefore, the fixed pattern noise which occurs on each captured image can be scattered on the composite image to reduce the effect of the pattern noise on the composite image.

With the conventional image capture apparatus, however, in the event that the hands of a user shake during continuous shooting, the positional displacement of the subject image on the captured images based on the rotation of the mirror may be negated. In that case, the positional relation between the particular subject image and the fixed pattern noise would be the same for the captured images. That is, in the event of a hand shake or a camera-shake, even if the captured images are combined, the conventional image capture apparatus may fail to scatter the fixed pattern noise on the composite image.

BRIEF SUMMARY OF THE INVENTION

According to an aspect of the invention, there is provided an image capture apparatus comprising: image capture means for shooting the image of a subject a number of times with an image sensor to produce a plurality of images in which fixed pattern noises may have been generated; compensating means for compensating for a displacement of the shooting range of the image sensor due to a camera-shake and shifting the image sensor so that the shooting range of the image sensor varies at each image capture time; and image combining means for combining the plurality of images with reference to specific corresponding portions of the images to create a composite image which is an averaged version of the plurality of images.

According to another aspect of the invention, there is provided a computer readable recording medium recorded with a program which causes a computer including image capture means for shooting the image of a subject a number of times using an image sensor to produce a plurality of images in which fixed pattern noises have been generated and drive means for shifting the image sensor to carry out a compensating process of compensating for a displacement of the shooting range of the image sensor due to a camera-shake and causing the drive means to shift the image sensor so that the shooting range of the image sensor varies at each image shooting time; arid an image combining process of combining the plurality of images with reference to specific corresponding portions of the images to create a composite image which is an averaged version of the plurality of images.

According to the present invention, the effect of the fixed pattern noise on captured images can be reduced with certainty even when a camera-shake occurs during shooting.

DETAILED DESCRIPTION OF THE INVENTION

An image capture apparatus embodying the present invention will be described hereinafter with reference to the accompanying drawings.

Figure 1:
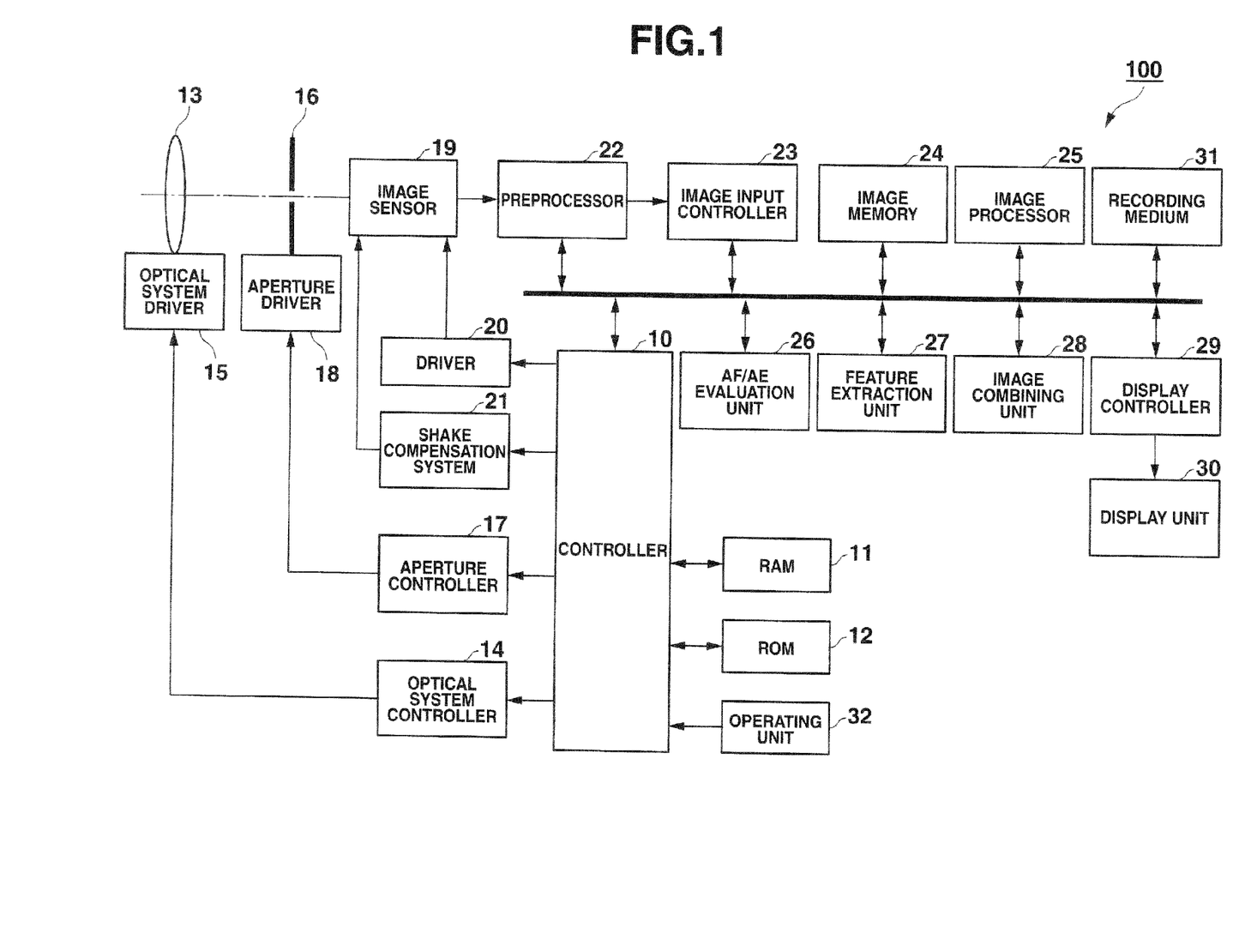
FIG. 1 is a block diagram of an image capture device according to an embodiment of the invention.

FIG. 1 is a block diagram of the image capture apparatus, which is indicated at 100. Using FIG. 1, a description is given of the image capture apparatus 100, which can be constructed in the form of a digital camera.

The image capture apparatus 100 is equipped with a controller 10, a RAM 11, a ROM 12, an optical lens system 13, an optical system controller 14, an optical system driver 15, a diaphragm 16, a diaphragm controller 17, a diaphragm driver 18, an image sensor 19, an image sensor driver 20, a camera-shake compensation system 21, a preprocessor 22, an image input controller 23, an image memory 24, an image processor 25, an AF/AE evaluation unit 26, a feature extraction unit 27, an image combining unit 28, a display controller 29, a display unit 30, a recording medium 31, and an operating unit 32.

The controller 10, which is comprised of a central processing unit (CPU) or the like, controls the operation of the entire image capture apparatus.

The RAM 11, which is comprised of a dynamic random access memory (DRAM) or the like, functions as a working memory when the controller 10 carries out each process. The ROM 12, which is comprised of a flash memory or the like, stores an image-sensor-shift-type shake compensation control program and programs needed to carry out processes indicated in the flowchart of FIG. 4. The controller 10 performs each process in cooperation with the programs stored in the ROM 12 with the RAM 11 as the working memory.

The optical lens system 13 is composed of focusing and zoom lenses. The focusing lens is adapted to focus a subject image onto the light receiving surface of the image sensor 19.

The optical system controller 14 controls the optical system driver 15 under the control of the controller 10 to cause it to move the focusing lens along the optical axis of the optical system. Thereby, the position of the focusing lens is changed to adjust the focus. The optical system driver 15 is formed from a stepper motor or the like. The optical system controller 14 is formed from a control circuit to control the optical system driver 15.

The diaphragm blades 16 function as an adjustable diaphragm to control the amount of light of a subject image incident on the image sensor 19. The diaphragm blades 16 change the lens opening in a stepwise manner within the range of F3.1 to F8.

The diaphragm controller 17 causes the diaphragm driver 18 to drive the diaphragm blades 16 under control of the controller 10.

The image sensor 19 is a device to store an image signal through photoelectric conversion (shooting) of a subject image focused by the optical lens system 13 onto its light receiving surface. The image sensor 19 has photodiodes as photoelectric converters arranged in rows and columns on its light receiving surface. The image sensor 19 has an electronic shutter function by adjusting the exposure time thereof. At the time of shooting, the shutter speed which is the exposure time is adjusted by this electronic shutter function. The exposure time of the image sensor 19 may be controlled by a mechanical shutter instead of the electronic shutter function. The image sensor 19 may be formed from a CMOS (Complementary Metal-Oxide Semiconductor) type of image sensor or the like. Alternatively, the image sensor may be formed by a CCD (Charge Coupled Device) type image sensor.

The driver 20 sequentially outputs image signals stored in the image sensor as analog signals at regular intervals under control of the controller 10. The shutter speed of the electronic shutter function of the image sensor 19 can be changed over the range of, say, ¼ to 1/512 of a second by adjusting parameters set by the controller 10 in the driver 20.

The shake compensation system 21 moves the image sensor 19 in the plane perpendicular to the optical axis of the image capture apparatus 100 in accordance with the image-sensor-shift-type shake compensation control performed by the controller 10. Thereby, the position of the image sensor 19 is corrected so that the position of the subject image focused onto the image sensor changes little even in the event of a camera-shake. To compensate for the camera-shake, an optical-system shifting shake compensation system may also be used which is adapted to move a separately set anti-shake lens in the plane perpendicular to the optical axis.

Figure 2:
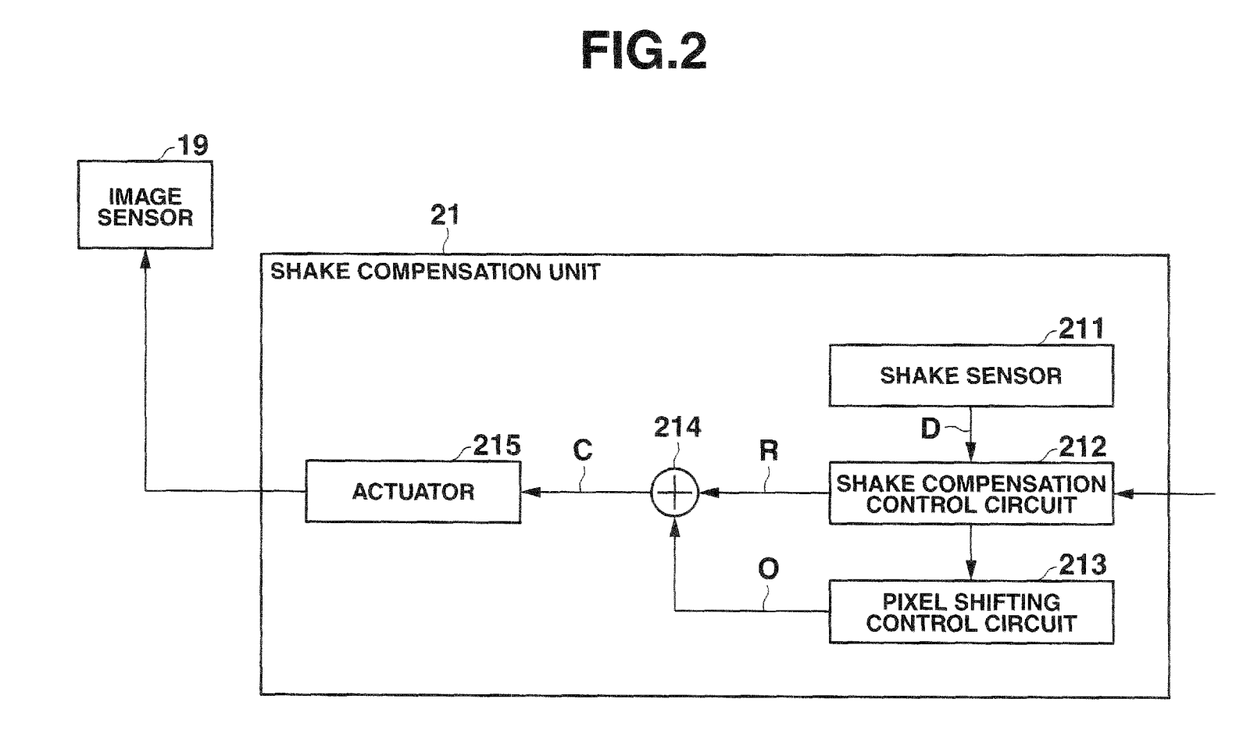
FIG. 2 is a detailed block diagram of the shake compensation system of FIG. 1.

FIG. 2 is a detailed block diagram of the shake compensation system 21. The shake compensation system includes, as shown in FIG. 2, a shake sensor 211, a shake compensation control circuit 212, a pixel shifting control circuit 213, an adder circuit 214, and an actuator 215.

The shake sensor 211 detects the angular velocities of the image sensor 100 in the pitch and yaw directions in the event of a camera-shake due to a change in the user's stance while holding the image capture apparatus 100. The shake sensor converts the detected angular velocities into an electrical signal, which is output as a detected signal D. The shake sensor 211 is formed from an angular-velocity sensor or the like.

The shake compensation control circuit 212 integrates the angular velocity denoted by the detected signal D from the shake sensor 211 with respect to time to thereby calculate an angular displacement which is an angle of deflection of the image capture apparatus 100 held by a user. The control circuit 212 then calculates a change in the position of the image sensor 19 due to camera-shake in pixel units on the basis of the calculated angular displacement of the image sensor 19 and the focal length of the focusing lens. The control circuit 212 calculates camera-shake compensation information for offsetting the calculated change in the position of the image sensor and outputs a compensation signal R representing the calculated shake compensation information.

The pixel shifting control circuit 213 outputs an offset signal O denoting an instruction to cause the image sensor 19 to move by a given distance in the plane perpendicular to the optical axis only at the start of each shooting operation in the continuous-shoot and image combining mode. This offset signal O is a fixed signal which does not depend upon the magnitude of the angular velocity of the image capture apparatus 100 which is denoted by the detected signal D.

The adder circuit 214 adds together the compensation signal R from the shake compensation control circuit 212 and the offset signal O from the pixel shifting control circuit 213 and then outputs the resulting signal as a control signal C. That is, the compensation information denoted by the control signal C is information such that the pixel shifting information indicated by the offset signal O is reflected in the shake compensation information denoted by the compensation signal R.

The actuator 215 responds to the control signal C from the adder 214 to shift the image sensor 19 in the plane perpendicular to the optical axis of the image capture apparatus 100.

Referring back to FIG. 1, the preprocessor 22 subjects the analog signal output from the image sensor 214 to preprocessing operations, such as correlated double sampling, gain control, analog-to-digital conversion, etc., to produce a digital signal. The resulting digital signal is then output. The preprocessor includes an analog-to-digital converter.

The image input controller 23 makes the digital signal output from the preprocessor 22 be stored into the image memory 24.

The image memory 24 temporarily stores digital signals produced by the preprocessor 22 and image data produced by the image processor 25. The image memory 24 is comprised of a DRAM or the like.

The image processor 25 reads a digital signal from the image memory 24 and then subjects it Lo image processing operations, such as white balance control, gamma (γ) correction, Y-C conversion, etc., to produce image data comprised of a brightness signal and color difference signals. This image data represents the image of a subject. When the shutter button is fully depressed, the image processor 25 produces image data for a captured image of relatively high quality and large data size. When displaying a live view image, on the other hand, the image processor 25 produces image data for a live view image of relatively low quality and small data size. The image processor 25 stores the produced image data into the image memory 24 again. In addition, the image processor 25 compresses image data in accordance with a given data compression format. The image processor 25 includes a digital signal processor (DSP) and the like.

In this embodiment, the high-frequency components of synchronized pulses caused from a common clock pulse in the image capture apparatus 100 mixed with an image signal output from the image sensor 19 through capacitive coupling between crossed wiring patterns and the like. Thereby, a fixed pattern noise in the form of a vertical line with respect to the yaw direction is produced in the same position in the images represented by image data produced by the continuous shooting operations.

The AF/AE evaluation unit 26 extracts AF evaluation values which are high-frequency components from image data for live view images sequentially stored into the image memory 24 and then supplies each of the extracted AF evaluation values in sequence to the controller 10. In addition, the AF/AE evaluation unit calculates the integral value of brightness of image data stored in the image memory 24 and then supplies the resulting integral value to the controller 10 as AE evaluation data.

The feature extraction unit 27 detects feature portions corresponding to the kind of a previously specified subject from image data stored in the image memory 24. The kind of a specified subject can be changed. For example, the kinds of subjects previously specified include whole body images (figures) or faces of persons. The kinds of subjects detected by the feature extraction unit 27 are set by the user through the operating unit 32 or are set according to the shooting modes of the image capture apparatus 100 (such as the landscape shooting mode, the person shooting mode, etc.).

The feature extraction unit 27 extracts feature portions corresponding to the specified subject kind at given sampling points on the image represented by image data stored in the image memory 24. Specifically, the feature extraction unit 27 calculates similarities between the image data and model data through a matching process and then extracts, as feature portions, image components at sampling points where the calculated similarities are above a given threshold. In the ROM 12, information representing feature portions of a number of kinds of subjects has been stored in advance as model data. For example, model data associated with the faces of persons include image data representing faces and local feature data representing eyes and mouths. Model data of predetermined sizes is read out from the ROM 12 in accordance with the kinds of the specified subjects.

As the matching process carried out by the feature extraction unit 27, use may be made of the technique disclosed in, for example, Jpn Pat. Appln. KOKAI Publication No. 9-130714. This technique involves scanning a captured image data by a pixel block unit of 4×4 pixels, for example, of a template image data (model data) of a size corresponding to the subject distance to the subject to be captured, to calculate a normalized correlation coefficient at each matching point, so that a distribution of similarities between local portions of the image and pixel blocks of the model data is calculated. Note that the matching process is not limited to the above technique and any other known technique may be appropriately employed.

The image combining unit 28 combines captured image data with reference to the feature portions extracted by the feature extraction unit, that is, in a state in which the positions of the corresponding feature portions coincide with one another, and creates composite image data representing a composite image.

The display controller 29 reads image data from the image memory 24 and converts it into an analog signal under control of the controller 10. The display controller includes a VRAM (Video Random Access Memory) and a digital-to-analog converter.

The display unit 30 displays an image represented by an analog signal output from the display controller 29. The display unit 30 is comprised of a liquid crystal display set up on the back of the body of the image capture apparatus 100.

The recording medium 31 is adapted to record image data produced by the image processor 25. The recording medium 31 is comprised of a semiconductor memory card which can be removably loaded into the image capture apparatus 100.

The operating unit 32 accepts operations of buttons performed by the user. The operating unit 32 is equipped with a power button, a shutter button, a zoom button, a cursor key, a decision button, a menu button, etc. The operating unit 32 sends signals representing key operations performed by the user to the controller 10. The shutter button is configured to accept from the user a halfway depressing operation to instruct preparation for shooting (AF/AE processing, etc.) and a fully depressing operation to instruct shooting. Upon receipt of an instruction signal from the operating unit 32, the controller 10 carries out a process corresponding to the received signal.

Figure 3:
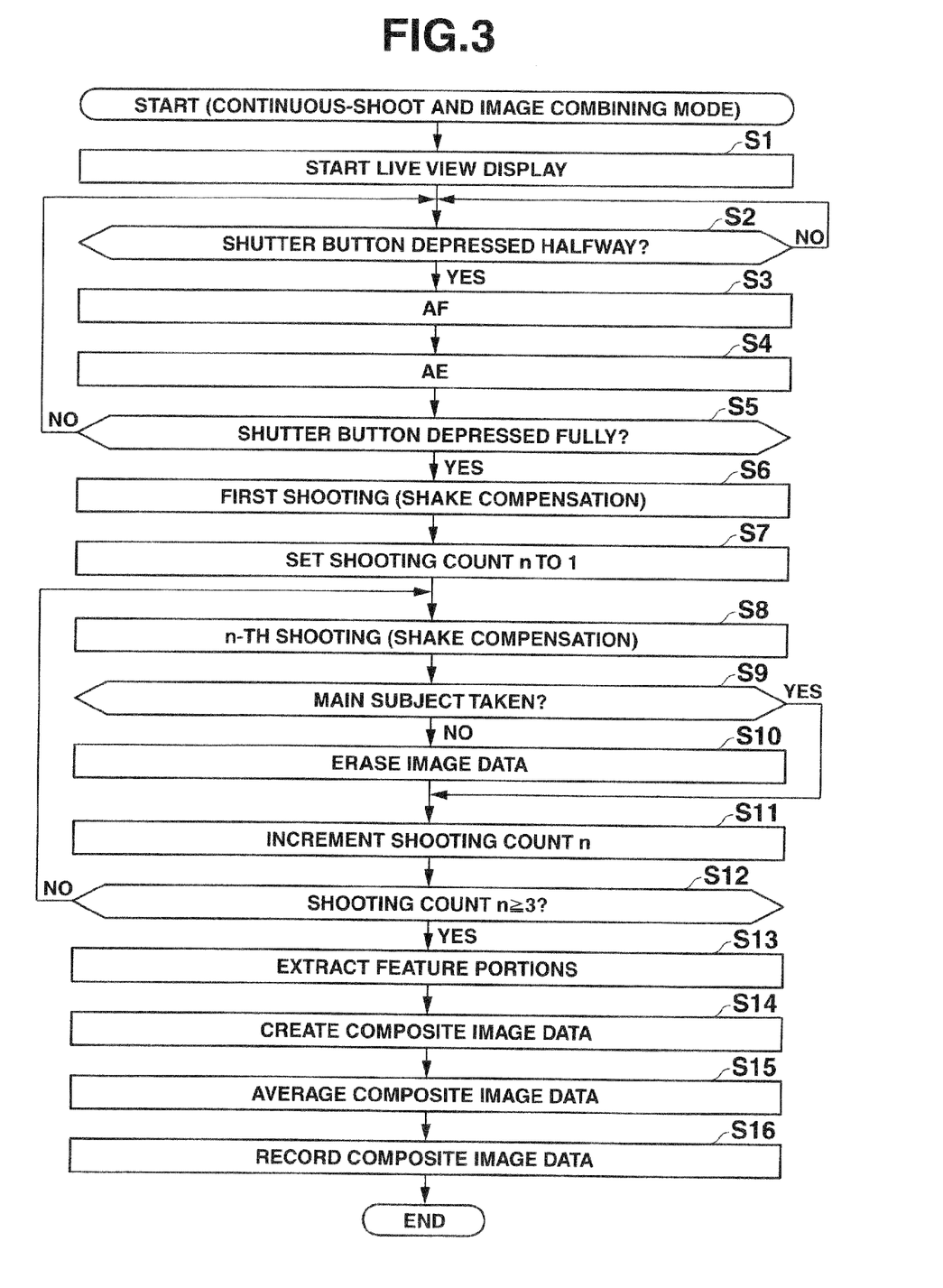
FIG. 3 is a flowchart illustrating a captured image combining process carried out by the image capture apparatus of FIG. 1.

FIG. 3 is a flowchart illustrating the operation in the continuous-shoot and image combining mode of the image capture apparatus 100 according to this embodiment. Using this flowchart, the operation of the image capture apparatus 100 in the continuous-shoot and image combining mode will be described below. In the embodiment, the line width of the fixed pattern noise image in the vertical direction perpendicular to the yaw direction is assumed to have a value corresponding to one pixel. Further, in the embodiment, a range of the subject image focused on the light receiving surface of the image sensor 19 through the optical lens system 13 is assumed to be a "shooting range".

In this embodiment, it is assumed that the user shoots a stationary main subject while holding the image capture apparatus 100 with his or her hands. It is further assumed that a camera-shake occurs all the time during shooting because the hands of the user holding the image capture apparatus 100 shake all the capture time.

When the continuous-shoot and image combining mode is set by a user operating a menu button, the controller 10 reads a program adapted for the continuous-shoot and image combining mode from the ROM 12 and then initiates the procedure indicated by the flowchart of FIG. 3 in cooperation with that program.

First, in step S1, the controller 10 initiates live view display. Specifically, the controller 10 causes the image processor 25 to produce image data for live view display. The controller 10 then applies the live view image data to the display controller 29 to cause the display unit 30 to display live view images. After that, the controller 10 applies each live view image data produced by the image processor 25 in sequence to the display controller 29, which in turn causes the display unit 30 to display the live view images.

Next, in step S2, the controller 10 makes a decision as to whether or not the shutter button has been halfway depressed by the user. Specifically, the controller 10 monitors a signal corresponding to halfway depression of the shutter button from the operating unit 32 to decide whether or not the shutter button has been halfway depressed by the user. If the decision is that the shutter button is not halfway depressed by the user (NO in step S2), the controller 10 is placed in the wait state until a signal corresponding to halfway depression of the shutter button from the operating unit 32 is detected. If, on the other hand, the decision is that the shutter button has been halfway depressed by the user (YES in step S2), then the procedure goes to step S3.

Next, in step S3, the controller 10 carries out AF processing. Specifically, the controller 10 causes the optical system driver 15 through the optical system controller 14 to move the focusing lens along the optical axis into the shooting position where the AF evaluation value from the AF/AE evaluation unit 28 becomes highest.

Next, in step S4, the controller 10 carries out AE processing. Specifically, the controller 10 determines an exposure condition consisting of shutter speed, lens opening value, and ISO sensitivity on the basis of an AE program chart read from the ROM 12 and exposure data from the AF/AE evaluation unit 26. The controller 10 then applies a control signal representing the exposure condition thus determined to the diaphragm controller 17 and the like to control them so that proper exposure of the apparatus is obtained.

Next, in step S5, the controller 10 makes a decision of whether or not the shutter button has been fully depressed by the user. Specifically, the controller 10 monitors a signal representing the full depression of the shutter button from the operating unit 32 to thereby decide whether or not the user has fully depressed the shutter button. If the decision is that the shutter button is not fully depressed (NO in step S3), the procedure returns to step S2. If, on the other hand, the decision is that the shutter button has been fully depressed (YES in step S3), the procedure goes to step S6. The image capture apparatus 100 carries out shooting three times in succession in response to a single operation of fully depressing the shutter button by the user.

Next, in step S6, the controller 10 carries out the first shooting. Specifically, the controller 10 causes the driver 20 to expose the image sensor 19 to image light from the subject at a shutter speed determined in step S5, thereby allowing the image sensor 19 to store an image signal. Upon the lapse of the exposure time, the controller 10 causes the driver to output the image signal stored in the image sensor 19 as an analog image signal. The preprocessor 22 converts this analog signal into a digital signal. The image input controller 23 stores the digital signal from the preprocessor 22 into the image memory 24. The image processor 25 produces image data from the digital signal stored in the image memory 24 and stores the resulting image data into the image memory 24 again.

In addition, the controller 10 performs shake compensation control during the first shooting.

Figure 4:
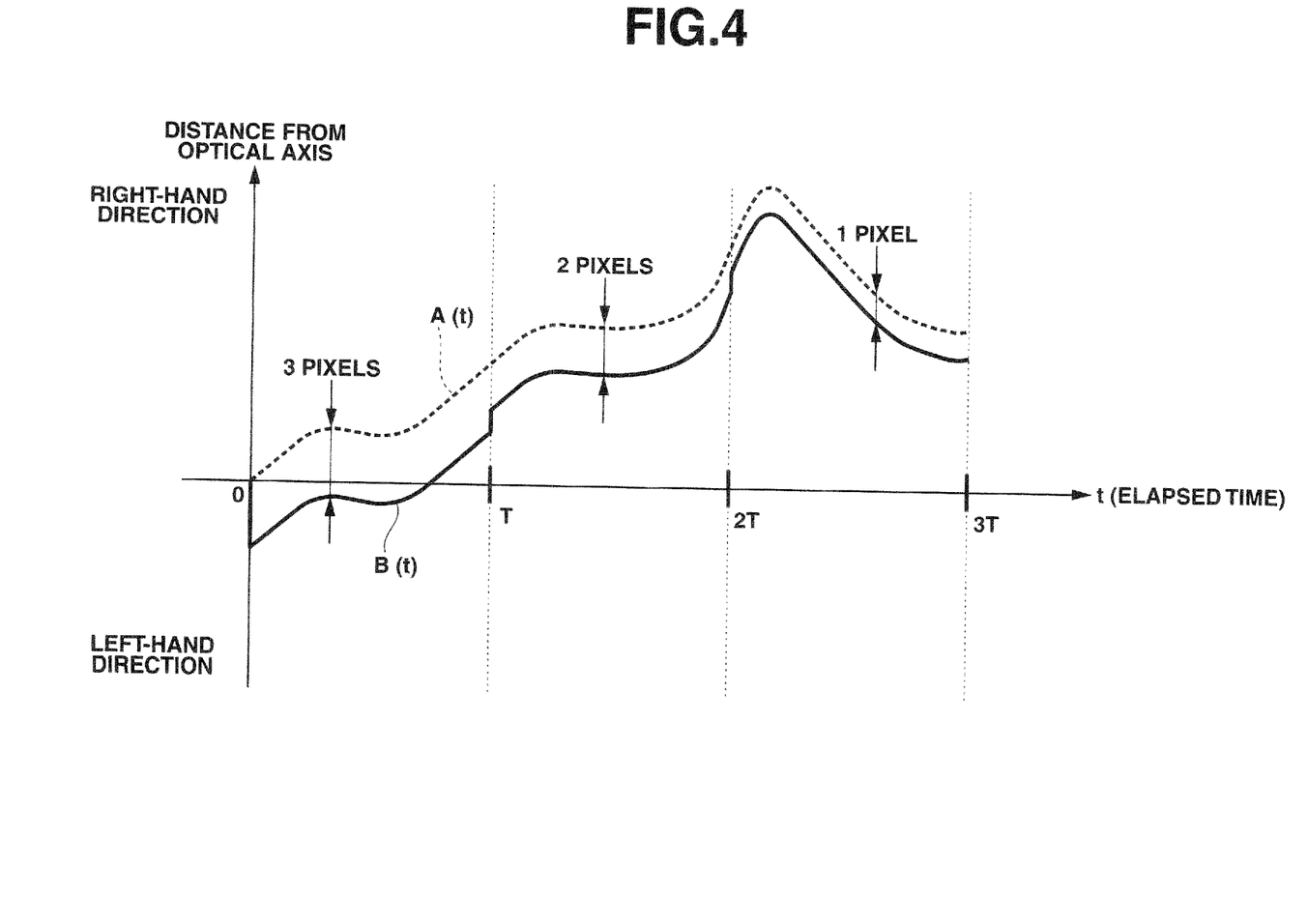
FIG. 4 shows a positional relationship of the main subject and the image sensor relative to the optical axis of the image capture apparatus.

FIG. 4 shows the positional relationship of the main subject relative to the optical axis of the image capture apparatus 100 and the positional relationship of the image sensor 19 relative to the optical axis of the image capture apparatus.

In FIG. 4, the abscissa is the time axis, indicating the elapsed time t from the point in time at which the first shooting is initiated. The origin O (elapsed time t=0) indicates the point in time at which the first shooting is initiated. The time T corresponding to one graduation on the abscissa is the time required by a single shooting operation. The ordinate indicates the relative distance of the main subject or the image sensor 19 to the optical axis of the image capture apparatus 100 in the yaw direction. On the ordinate, the right-hand direction in the yaw direction is set positive and the left-hand direction is set negative. The unit of the ordinate is a distance corresponding to one pixel. Here, the distance corresponding to one pixel is the distance required to move the image sensor 19 in real space so that the shooting range of the image sensor 19 is shifted or displaced by one pixel.

Figure 5:
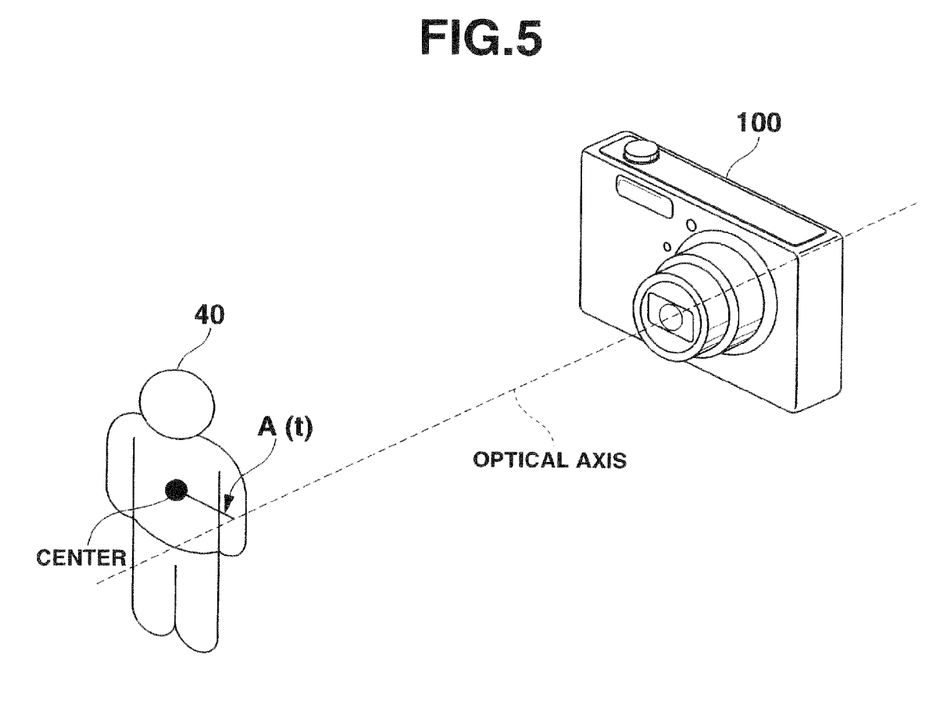
FIG. 5 schematically shows the distance A(t) between the optical axis of the image capture apparatus and the center of the main subject in the yaw direction.

In FIG. 4, the distance A(t) from the optical axis of the image capture apparatus 100 to the center of the main subject in the yaw direction is indicated by broken lines. FIG. 5 is a schematic representation of the distance A(t). In FIG. 5, the reference numeral 40 denotes the main subject. The distance A(t) from the optical axis of the image capture apparatus to the main subject varies from time to time because the image capture apparatus shakes due to the occurrence of the camera-shake. The position of the main subject after the lapse of time t is displaced from the optical axis of the image capture apparatus in the yaw direction by a distance corresponding to A(t) number of pixels.

In this embodiment, it is supposed that the position of the main subject at the first-shooting initiation time (t=0) exists on the optical axis. The main subject is stationary as described previously. As shown in FIG. 4, the value of the distance A(t) from the optical axis of the image capture apparatus 100 to the center of the main subject in the yaw direction is positive all the time. Thus, the example of FIG. 4 means that, during the continuous shooting, the optical axis of the image capture apparatus 100 is displaced in the left-hand direction by A(t) number of pixels in comparison with at the shooting initiation time because the image capture apparatus shakes due to the camera-shake. In other words, the main subject is displaced all the time in the right-hand direction relative to the image capture apparatus 100 during the continuous shooting.

Figure 6:
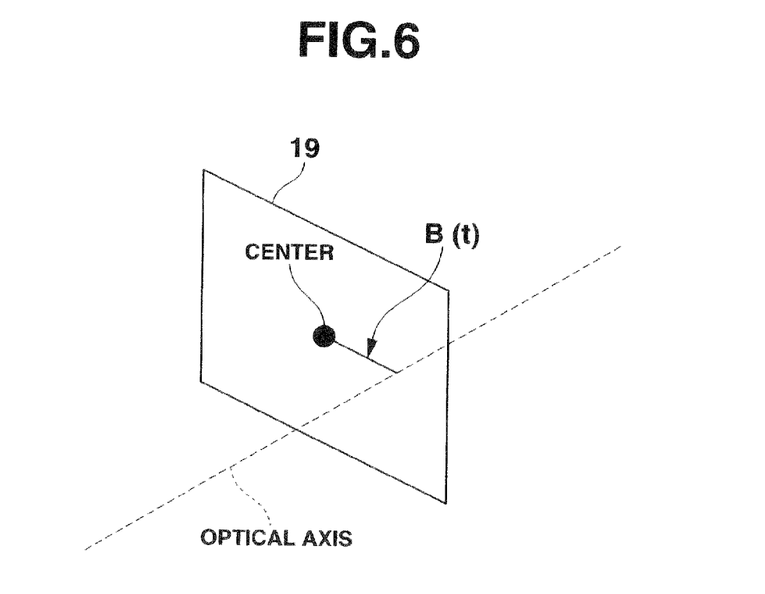
FIG. 6 schematically shows the distance B(t) between the optical axis of the image capture apparatus and the center of the image sensor in the yaw direction.

In FIG. 4, the distance B(t) from the optical axis of the image capture apparatus 100 to the center of the image sensor 19 in the yaw direction is indicated by a solid line. FIG. 6 is a schematic representation of the distance B(t). The distance B(t) from the optical axis of the image capture apparatus 100 to the center of the image sensor 19 in the yaw direction varies from time to time because of the image-sensor-shift-type compensation control associated with the camera-shake. The position of the image sensor 19 at elapsed time t is displaced from the optical axis of the image capture apparatus in the yaw direction by a distance corresponding to B(t) number of pixels. At the first-shooting initiation time (t=0), the center of the image sensor 19 in the image capture apparatus is located on the optical axis.

Next, a description is given of the operation of the shake compensation system 21 for shake compensation control at the first-shooting time.

During the first shooting, the shake sensor 211 outputs a detected signal D representing the angular velocity of the image capture apparatus 100 associated with the camera-shake at regular intervals.

The shake compensation control circuit 212 receives the detected signal D from the shake sensor 211 to calculate shake compensating information for offsetting a change in the image sensor 19 position due to the camera-shake (the information representing the direction in which and the amount by which the image sensor 19 is to be moved). The control circuit 212 then outputs a compensating signal R indicating the calculated shake compensating information at regular intervals. Suppose here that the position of an arbitrary point on the image sensor 19 is (n, m). When the optical axis of the image capture apparatus 100 is displaced in the left-hand direction relative to the main subject by a distance corresponding to A(t) number of pixels, the compensating information represented by the compensating signal R will be (A(t), 0). Thus, the compensating signal R indicates an instruction to shift the position (n, m) of each pixel to (n+A(t), m), i.e., to shift the image sensor 19 in the right-hand direction by a distance corresponding to A(t) number of pixels.

The pixel shifting control circuit 213 outputs an offset signal O indicating pixel shifting information (−3, 0) only at the first-shooting initiation time (t=0). This offset signal O denotes an instruction to shift the image sensor 19 in the left-hand direction by a distance corresponding to the number of pixels which is the same as the number of shooting times is to be made in succession by a single shutter button operation. In this embodiment, the number of shooting times to be made in succession is three. For this reason, the offset signal O indicates an instruction to shift the position (n, m) of each pixel to (n−3, m), that is, to shift the image sensor 19 in the left-hand direction by a distance corresponding to three pixels.

At the first-shooting initiation time (t=0), the adder 214 outputs a control signal C which reflects shake compensating information denoted by the compensating signal R and pixel shifting information denoted by the offset signal O. Thus, the compensating information denoted by the control signal C at the first-shooting initiation time is (A(t)−3, 0). That is, the control signal C at the first-shooting initiation time indicates an instruction to shift the image sensor 19 in the right-hand direction by a distance corresponding to (A(t)−3) number of pixels.

At the first-shooting initiation time (t=0), the actuator 215 responds to the control signal C from the adder 214 to shift the image sensor 19 in the right-hand direction in the plane perpendicular to the optical axis by a distance corresponding to (A(t)−3) number of pixels.

At the first-shooting initiation time (t=0), a camera-shake does not yet occur. Thus, the compensating information denoted by the compensating signal R is (0, 0). For this reason, as shown in FIG. 4, at the first-shooting initiation time (t=0), the image sensor 19 is displaced relative to the optical axis in the left-hand direction by a distance corresponding to three pixels owing to the offset signal O. Since the main subject is positioned on the optical axis at the first-shooting initiation time (t=0) as stated above, the image sensor 19 is displaced relative to the main subject in the left-hand direction by a distance corresponding to three pixels at this point.

During the interval from the first-shooting initiation time to the second-shooting initiation time (0<t<T), the pixel shifting control circuit 213 stops outputting the offset signal O. Therefore, the compensating signal R output from the shake compensation control circuit 212 based on the detected signal D from the shake sensor 211 is applied as it is to the actuator 215 as the control signal C. During this interval, the actuator 215 responds to the control signal C to shift the image sensor 19 so as to offset a change in the image sensor position due to the camera-shake. Thereby, during the interval from the first-shooting initiation time to the second-shooting initiation time (0<t<T), the image sensor position follows the main subject position with the image sensor 19 displaced relative to the main subject in the left-hand direction by a distance corresponding to three pixels as shown in FIG. 4.

Figure 7A:
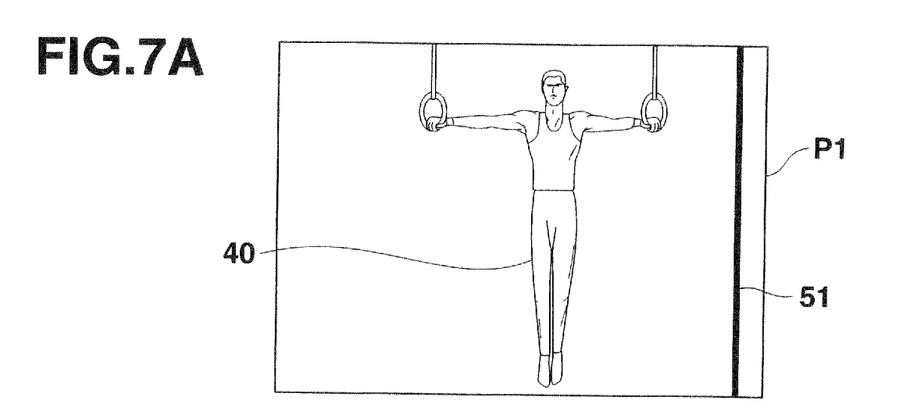
FIG. 7A shows an example of a first image captured in the continuous-shoot mode by the image capture apparatus of FIG. 1.

FIG. 7A shows an image P1, which is an example of a first image represented by image data produced by the first shooting. In this first image, fixed pattern noise 51 having a one-pixel line width comes out together with the main subject 40. The first image P1 serves as the reference image in the image data combining process to be described later.

Returning now to FIG. 3, the controller 10 sets 1as the number of times shooting has been made (n=1) in step S7. Specifically, the controller 10 stores into the RAM 11 information indicating that the number of times shooting has been made (shooting count) is 1.

Next, in step S8, the controller 10 carries out the second shooting. The specific processing contents in the second shooting are the same as those in the first shooting. In addition, the controller 10 performs shake compensation control during the second shooting.

A description is given here of the processing operation of the shake compensating system 21 in shake compensation control at the time of the second shooting.

During the second shooting, the shake sensor 211 outputs a detected signal D indicating the angular velocity of the image capture apparatus 100 based on the camera-shake at regular intervals.

The shake compensation control circuit 212 responds to the detected signal D from the shake sensor 211 to calculate shake compensating information for offsetting a change in the image sensor position due to the camera-shake. Then, the shake compensation control circuit 212 outputs a compensating signal R indicating the calculated shake compensating information at regular intervals.

The pixel shifting control circuit 213 outputs an offset signal O indicating pixel shifting information (1, 0) at the second-shooting initiation time (t=T). This offset signal O indicates an instruction to shift the position (n, m) of each pixel to (n+1, m), that is, to shift the image sensor 19 in the right-hand direction by a distance corresponding to one pixel.

At the second-shooting initiation time (t=T), the adder 214 outputs a control signal C which reflects shake compensating information denoted by the compensating signal R and pixel shifting information denoted by the offset signal O. Thus, the compensating information denoted by the control signal C at the second-shooting initiation time is (A(t)+1, 0). That is, the control signal C at the second-shooting initiation time indicates an instruction to shift the image sensor 19 in the right-hand direction by a distance corresponding to (A(t)+1) number of pixels.

At the second-shooting initiation time (t=T), the actuator 215 responds to the control signal C from the adder 214 to shift the image sensor 19 in the right-hand direction in the plane perpendicular to the optical axis by a distance corresponding to (A(t)+1) number of pixels.

As shown in FIG. 4, the offset signal O changes the shooting range of the image sensor 19 from the state in which the image sensor is displaced relative to the main subject by a distance corresponding to three pixels during the first shooting (0≤t<T) to the state in which the image sensor is displaced relative to the main subject by a distance corresponding to two pixels at the second-shooting initiation time (t=T).

During the interval from the second-shooting initiation time to the third-shooting initiation time (T<t<2T), the pixel shifting control circuit 213 stops outputting the offset signal O. Therefore, the compensating signal R output from the shake compensation control circuit 212 based on the detected signal D from the shake sensor 211 is applied as it is to the actuator 215 as the control signal C. During this interval, the actuator 215 responds to the control signal C to shift the image sensor 19 so as to offset the change in the image sensor position due to the camera-shake. Thereby, during the interval from the second-shooting initiation time to the third-shooting initiation time (T<t<2T), the image sensor position follows the main subject position with the image sensor 19 displaced relative to the main subject in the left-hand direction by a distance corresponding to two pixels as shown in FIG. 4. Then, the shooting range of the image sensor 19 is displaced by one pixel all the time during the second shooting compared with that during the first shooting.

Figure 7B:
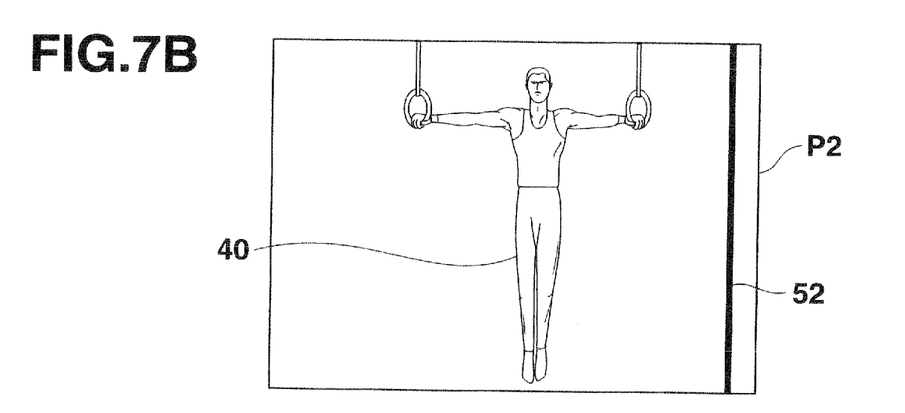
FIG. 7B shows an example of a second image captured in the continuous-shoot mode by the image capture apparatus of FIG. 1.

FIG. 7B shows a second image P2 represented by image data produced by the second shooting. The subject of this image remains unchanged from that in the first image P1 since the subject 40 is held in a stationary state. In this second image P2, fixed pattern noise 52 comes out together with the main subject 40. The shooting range of the second image P2 (the range of the second shooting) is displaced by one pixel relative to the shooting range of the first image P1 (the range of the second shooting). For this reason, the position of the main subject 40 in the second image P2 is displaced by one pixel relative to that in the first image P1.

The fixed pattern noises 51, 52 are generated in a given area of the image sensor 19 irrespective of the position of the image sensor 19. Thus, the position of the area where the each fixed pattern noise is generated is the same for the first image P1 and the second image P2, even if the positions of the images P1 and P2 are different from each other in the shooting range. For this reason, the distance between the main subject 40 and the fixed pattern noise 51 in the first image P1 differs from the distance between the main subject 40 and the fixed pattern noise 52 in the second image P2 by a distance of one pixel.

Referring back to FIG. 3, in step S9, the controller 10 makes a decision of whether or not the main subject has been taken in the newly captured image by the preceding process in step S5. Specifically, the controller 10 makes a decision of whether or not there are approximate image portions between the newly captured image and the reference image (the first image) stored in the image memory. If the decision is that there are approximate image portions, then the controller 10 decides that the main subject has been taken in the newly captured image. If, on the other hand, the decision is that there are no approximate image portions, then the controller 10 decides that the main subject has not been taken in the newly captured image. NO in step S9 is considered to be a result of failure of shifting of the image sensor 19 for shake compensation to compensate for a change in the image sensor shooting range due to the camera-shake because of a very large change in the position of the image capture apparatus 100 due to the camera-shake.

The method of deciding whether or not there are approximate image portions between the new image and the reference image (the first image) is arbitrary. For example, the following method can be considered. To facilitate understanding, it is supposed that each captured image is composed of 800×600 pixels. First, the controller 10 divides the image into 200×125 blocks each of 4×4 pixels. Then, the controller 10 determines the sum of brightness values of pixels in each block for each of the newly captured image and the reference image. Next, the controller 10 determines the absolute value of the difference between the sum of brightness values of the newly captured image and the sum of brightness values of the reference image for each block. Here, the controller 10 sets a block in which the absolute value of the difference is below a given value as an approximate block. The controller 10 detects an image portion in which the density of approximate blocks is high. For example, the controller 10 makes a decision of whether or not there is an approximate block group in which four or more consecutive approximate blocks are present in each of the vertical and horizontal directions. If the decision is that there is no approximate block group, the controller 10 decides that there is no approximate image portion. If, on the other hand, the decision is that there is an approximate block group, the controller 10 decides that there is an approximate image portion and then sets that approximate block group as an approximate image portion.

If the decision is that the main subject has been taken in the newly captured image (YES in step S9), the procedure goes to step S11. Otherwise, the procedure goes to step S10.

In step S10, the controller 10 erases the image data produced by the preceding process in step S8 and stored in the image memory 24.

In step S11, the controller 10 increments the number, n, of times the shooting has been made so far (shooting count n) by one. Specifically, the controller 10 adds 1 to the shooting count n stored in the RAM 11.

In step S12, the controller 10 makes a decision of whether or not the shooting count n is three or more. Specifically, the controller 10 confirms the shooting count n stored in the RAM 11 to decide whether or not the shooting count n is three or more. If the decision is that the shooting count n is less than three, the procedure returns to step S8. If, on the other hand, the decision is that the shooting count n is three or more, the procedure goes to step S13.

When the shooting count n is two, the controller 10 carries out the third shooting in step S8. The specific processing of the third shooting is identical to that of the first shooting. In addition, the controller 10 makes shake compensation during the third shooting.

Next, a description is given of the processing by the shake compensation system 21 in shake compensation control at the third-shooting time.

During the third shooting, the shake sensor 211 outputs a detected signal D indicating the angular velocity of the image capture apparatus 100 based on the camera-shake at regular intervals.

The shake compensation control circuit 212 responds to the detected signal D from the shake sensor 211 to calculate compensating information for offsetting a change in the image sensor position due to the camera-shake. Then, the shake compensation control circuit 212 outputs a compensating signal R indicating the calculated shake compensating information at regular intervals.

The pixel shifting control circuit 213 outputs an offset signal O indicating pixel shifting information (1, 0) at the third-shooting initiation time (t=2T). This offset signal O indicates an instruction to shift the position (n, m) of each pixel to (n+1, m), that is, to shift the image sensor 19 in the right-hand direction by a distance corresponding to one pixel.

At the third-shooting initiation time (t=2T), the adder 214 outputs a control signal C which reflects shake compensating information denoted by the compensating signal R and pixel shifting information denoted by the offset signal O. Thus, the compensating information denoted by the control signal C at the third-shooting initiation time is (A(t)+1, 0). That is, the control signal C at the third-shooting initiation time indicates an instruction to shift the image sensor 19 in the right-hand direction by a distance corresponding to (A(t)+1) number of pixels.

At the third-shooting initiation time (t=2T), the actuator 215 responds to the control signal C from the adder 214 to shift the image sensor 19 in the right-hand direction in the plane perpendicular to the optical axis by a distance corresponding to (A(t)+1) number of pixels.

As shown in FIG. 4, the offset signal O changes the shooting range of the image sensor 19 from the state in which the image sensor position is displaced relative to the main subject position by a distance corresponding to two pixels during the second shooting (T≤t<2T) to the state in which the image sensor position is displaced relative to the main subject position by a distance corresponding to one pixel at the third-shooting initiation time (t=2T).

After the third-shooting initiation time (2T<t), the pixel shifting control circuit 213 stops outputting the offset signal O. Therefore, the compensating signal R output from the shake compensation control circuit 212 based on the detected signal D from the shake sensor 211 is applied as it is to the actuator 215 as the control signal C. During this interval, the actuator 215 responds to the control signal C to shift the image sensor 19 so as to offset the change in the image sensor position due to the camera-shake. Thereby, after the third-shooting initiation time (2T<t), the image sensor position follows the main subject position with the image sensor 19 displaced relative to the main subject in the left-hand direction by a distance corresponding to one pixel as shown in FIG. 4. Then, the shooting range of the image sensor 19 is displaced by one pixel all the time during the third shooting relative to that during the second shooting.

Figure 7C:
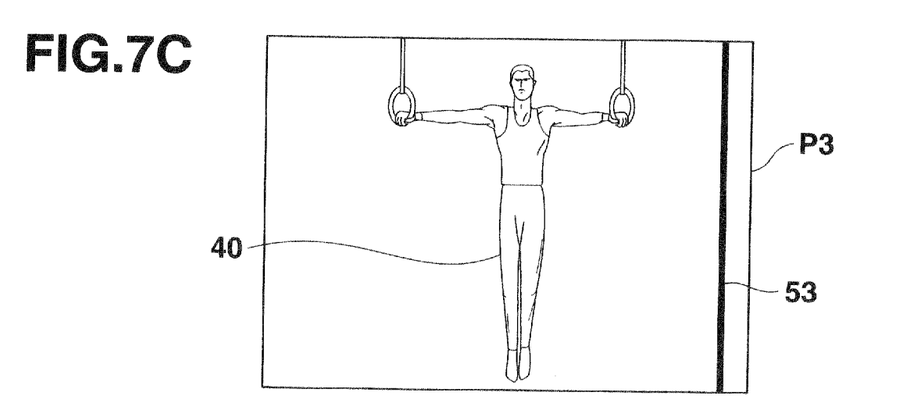
FIG. 7C shows an example of a third image captured in the continuous-shoot mode by the image capture apparatus of FIG. 1.

FIG. 7C shows a third image P3 represented by image data produced by the third shooting. The subject 40 of this image remains unchanged from those in the first and second images P1 and P2. In this third image, fixed pattern noise 53 comes out together with the main subject 40. The shooting range of the third image P3 (the third-shooting range) is displaced by one pixel relative to the shooting range of the second image P2 (the range of the second shooting). For this reason, the position of the main subject 40 in the third image P3 is displaced by one pixel relative to that in the second image P2 and by two pixels relative to that in the first image P1.

The positions where the fixed pattern noises are generated in image data are the same for the first, second and third images P1, P2 and P3 which are different from one another in the shooting range. For this reason, the distance between the main subject 40 and the fixed pattern noise 52 in the second image P2 differs from the distance between the main subject 40 and the fixed pattern noise 53 in the third image P3 by one pixel. In addition, the distance between the main subject 40 and the fixed pattern noise 51 in the first image P1 differs from the distance between the main subject 40 and the fixed pattern noise 53 in the third image P3 by two pixels.

Figure 8:
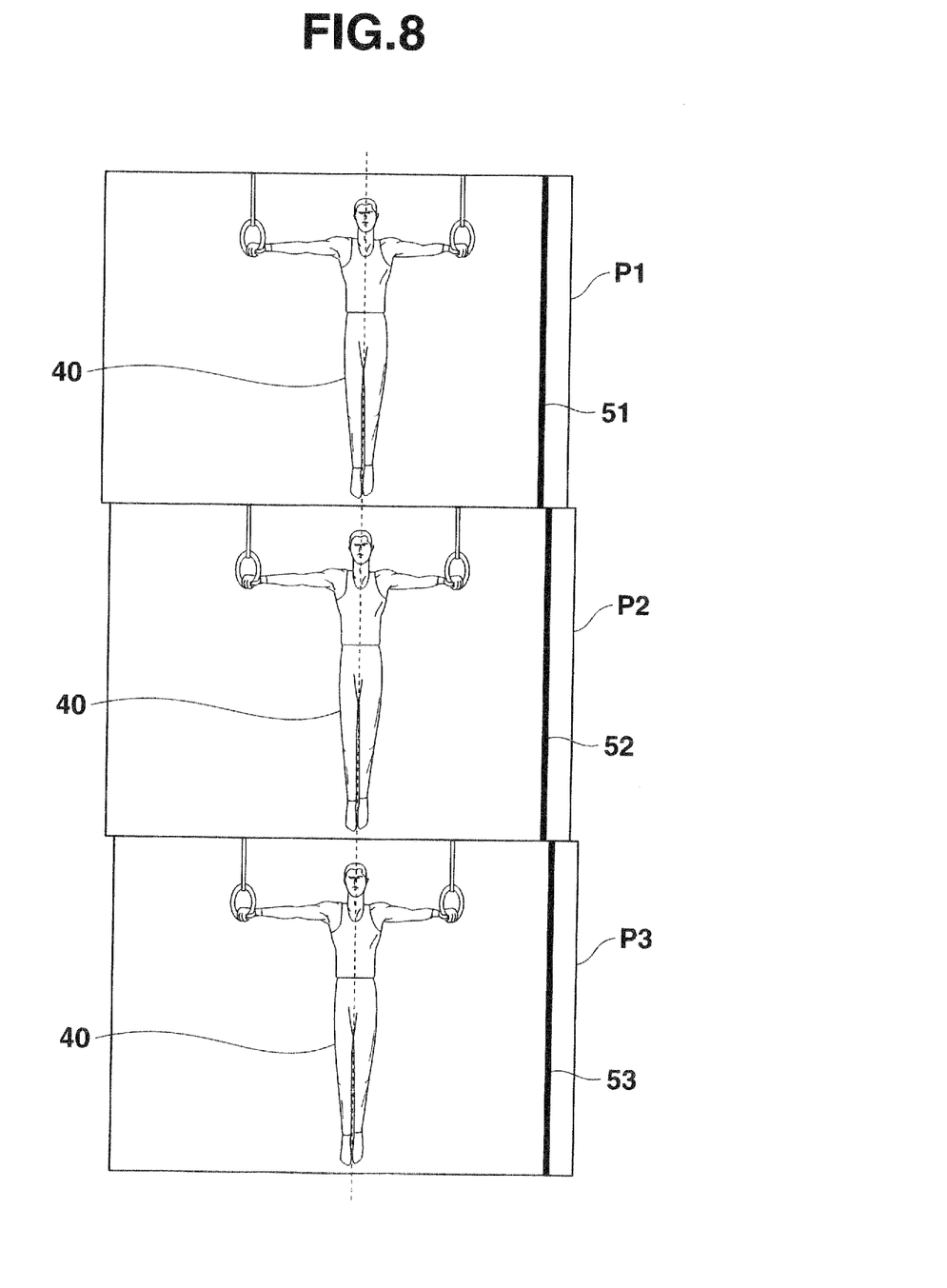
FIG. 8 shows an arrangement of the first, second and third images captured in the continuous-shoot mode with reference to the main subject.

FIG. 8 shows a time-series arrangement of the images P1, P2 and P3 with the main subjects 40 of the respective images are aligned vertically. As is evident from FIG. 8, the distance between the main subject 40 and the fixed pattern noise 51 in the image P1, the distance between the main subject 40 and the fixed pattern noise 52 in the image P2 and the distance between the main subject 40 and the fixed pattern noise 53 in the image P3 differ from one another.

Referring back to FIG. 3, if the decision in step S12 is that the shooting count is three or more, then the controller 10 extracts feature portions from each image represented by image data stored in the image memory 24 in step S13. Specifically, the controller 10 causes the feature extraction unit 27 to calculate similarities between the image data stored in the image memory 24 and the model data stored in the ROM 12 through a matching process and then extracts, as feature portions, image components at sampling points where the calculated similarities are above a given threshold. For example, when the face of a person is specified as the kind of a subject to be detected, local feature portions, such as ears, mouth, etc., are extracted.

Next, in step S14, the controller 10 creates composite image data. Specifically, the controller 10 causes the image combining unit 28 to create composite image data by combining the images represented by the image data stored in the image memory 24 with the feature portions extracted in step S13 registered with one another. At this point, in order for the feature portions of the respective images to be completely superimposed upon one another, the image combining unit 28 adjusts the relative position and size of the images and combines the images with the corresponding feature portions registered with one another. For example, if feature portions, such as eyes, mouth, etc., of the main subject person 40 have been extracted from the images P1, P2 and P3, these images are combined with the feature portions set in registration with one another.

Figure 9:
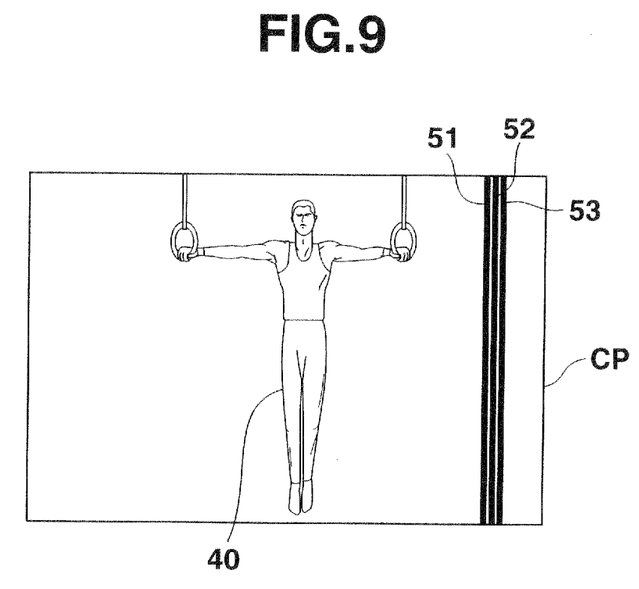
FIG. 9 shows an example of a composite image created by the image capture apparatus of FIG. 1.

FIG. 9 shows a composite image CP created by combining the images P1, P2 and P3. As shown, the images are combined so that their respective main subject feature portions are superimposed upon one another in the composite image. However, the combined images of the fixed pattern noises 51, 52 and 53 are displaced from one another by one pixel.

The image combining unit 28 temporarily sets each of the brightness and color difference values of each pixel in the composite image to the sum of corresponding values of the corresponding pixels in the original images P1 to P3. As a result, in the composite image, each of the brightness and color difference values of each pixel forming the main subject 40 becomes three times that in each of the original images P1, P2 and P3. On the other hand, as shown in FIG. 9, the combined fixed pattern noises 51, 52 and 53 are separated from one another in the composite image CP with their brightness and color difference values kept the same as before they were combined. However, this results merely in an increase in the number of the fixed pattern noises in the composite image while their brightness and color difference number thereof are kept as in their original values.

Accordingly, the controller 10 averages the composite image data in step S15. Specifically, the controller 10 causes the image combining unit 28 to average the brightness and color difference values of each pixel in the composite image. In this averaging process, the image combining unit 28 divides each of the brightness and color difference values of each pixel by three and sets the resultant values as its new brightness and color difference values. As the result of the averaging process, the brightness and color difference values of each pixel forming the main subject 40 becomes the same as those in each of the original images P1, P2 and P3. On the other hand, each of the brightness and color difference values of the fixed pattern noises 51, 52 and 53 becomes ⅓ of those in the original images.

Figure 10:
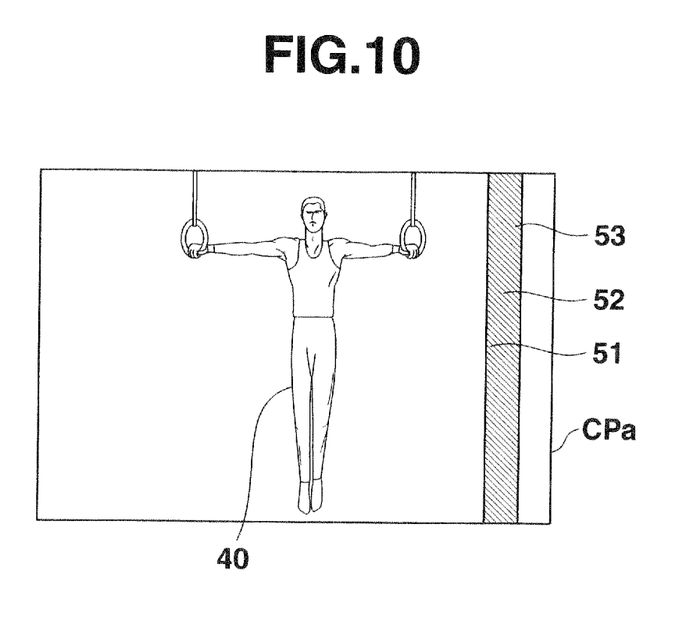
FIG. 10 shows an example of a composite image subjected to an averaging operation.

FIG. 10 shows a composite image CPa produced by performing the averaging process on the composite image CP. As shown, the composite image CPa becomes less conspicuous than the original images P1, P2 and P3 in the fixed pattern noises 51, 52 and 53 because their brightness and color difference values become ⅓ in the averaging process.

Returning to FIG. 3, the controller 10 records the composite image data subjected to the averaging process onto the recording medium 31 in step S16.

Thus, the controller 10 terminates the process of combining the continuously shot images shown in FIG. 3.

As described above, the image capture apparatus according to this embodiment is adapted to shift the image sensor 19 at each shooting initiation time in the continuous-shoot mode in the event of the camera-shake in response to a control signal C which reflects an offset signal O indicating pixel shifting information in a compensation signal R indicating shake compensating information. Thereby, changes in the image sensor shooting range due to the camera-shake are mostly compensated for and the shooting range is changed by one pixel each time shooting is made.

The camera-shake compensation process is performed in the yaw direction in the described embodiment for the sake of simplicity. In a case where fixed pattern noises are generated at the same positions in the continuously shot images in the pitch direction, the camera-shake in the pitch direction may also be compensated for by using the shake detection signal generated from the shake sensor 211 while the shooting range of the continuously shot images on the image sensor 19 is changed by one pixel or more in the pitch direction.

Thus, even if the shooting range is changed, fixed pattern noise appears in the same position on each captured image. According to the image capture apparatus 100, the captured images can be made different from one another in the distance between the feature portions (main subject) and the fixed pattern noise even in the event of the camera-shake. As a result, even in the event of the camera-shake, combining continuously shot images with reference to the feature portions allows the creation of a composite image in which fixed pattern noises in the original images are scattered.

In addition, the image capture apparatus 100 is adapted to perform average processing on the composite image. By so doing, the brightness and color difference values of pixels in each fixed pattern noise in the composite image are made smaller than those in each of the original image, thus allowing the fixed pattern noises in the composite image to become inconspicuous.

Thus, the image capture apparatus 100 of this embodiment allows the effect of fixed pattern noises produced on the captured images to be reduced with certainty even in the event of the camera-shake during a continuous shooting operation.

Furthermore, the image capture apparatus 100 is adapted to compensate for a camera-shake, by shifting the image sensor 19 in accordance with a compensating signal R based on image-sensor-shifting compensation control. By so doing, no subject image blur caused by the camera-shake is produced in each of continuously shot or captured images, thus allowing the prevention of degradation of image quality. She image capture apparatus combines image data free from degradation of image quality to create composite image data. As a result, the image quality of the composite image represented by the composite image data will not suffer.

Moreover, the image capture apparatus 100 is adapted to shift the image sensor 19 in the left-hand direction by a distance corresponding to the same number of pixels as the number of continuously shooting times in succession in response to an offset signal O at the first-shooting initiation time in the continuous-shoot mode. The image sensor 19 cannot be shifted beyond a limit position up to which the actuator 215 can shift the image sensor 19. However, this can afford a margin for the range over which the image sensor 19 can be moved within the image capture apparatus when it is moved in the right-hand direction at the second-shooting time and thereafter. That is, it becomes possible to diminish the possibility that the image sensor 19 is shifted beyond the limit position to thereby make the shake compensation control impossible at the second-shooting time and thereafter. This is particularly effective when the number of shooting times in succession is large and hence the sum of distances moved by the image sensor 19 in the right-hand direction at the shooting times is great.

The image capture apparatus 100 is adapted to erase an image in which the main subject is not taken from among continuously shot images. This allows the removal from images to be combined of an image in which the main subject is not taken which has feature portions to which reference is made in combining images. As a result, composite image data can be created by using only image data suitable for image composition.

The image capture apparatus 100 of this embodiment is adapted to set the direction of movement of the image sensor 19 indicated by the offset signal O produced at the first shooting time to the left-hand direction and the direction of movement of the image sensor 19 at the second shooting time and thereafter to the right-hand direction. However, the directions of movement of the image sensor 19 may be reversed. That is, the image sensor 19 may be shifted by the offset signal O in the right-hand direction at the first shooting time and in the left-hand direction at the second shooting time and thereafter.

The image capture apparatus 100 of this embodiment is configured to combine continuously shot images with their feature portions set in registration with one another to create composite image data. However, the controller 10 may cause the image combining unit 28 to combine the first image, an image such that the second image is displaced by one pixel in the right-hand direction, and an image such that the third image is displaced by two pixels in the right-hand direction to create a composite image. This approach can also combine the images in a state in which they are correctly superimposed upon one another with respect to the main subject.

The image capture apparatus 100 of this embodiment is adapted to set the pixel shifting information denoted by the offset signal O at the first shooting time for offsetting by three pixels. However, the pixel shifting information at the first shooting time may be four pixels or more (for example, 100 pixels).

The image capture apparatus 100 of this embodiment is adapted to set the pixel shifting information denoted by the offset signal O for shifting at the second shooting time and thereafter to one pixel, respectively. However, the pixel shifting information at the second shooting time and thereafter may be two pixels or more. Thus, when the line width of the fixed pattern noise is wide, the shooting range of the image sensor 19 may be shifted at least by number of pixels corresponding to the width of the fixed pattern noises.

The image capture apparatus 100 of this embodiment is configured to take three shots in succession. However, the number of continuously shooting times in the continuous-shoot mode need not be three. That is, the number of images which are used in creating a composite image need not be three.

The image capture apparatus 100 of this embodiment is adapted to detect a change in the position of the image capture apparatus 100 due to the camera-shake with the angular velocity sensor in the shake sensor 211. However, a motion vector on a captured image may be used to detect the change in the image capture apparatus position. A known method can be used to detect the motion vector.

The image capture apparatus 100 of this embodiment is adapted to perform an averaging process on composite image data after it has been created. However, each time an image is produced, in a three continuous shooting mode, for example, the averaging process may be performed on it to divide the brightness and color difference values of each pixel by three, in which case composite image data is created by combining averaged image data.

In this embodiment, the first image produced by continuous shooting is set as the reference image in combining image data. However, the reference image may be an image other than the first image.

Further, in a case where a main subject is not a stationary subject but a moving subject, it is not possible to use a feature portion of the subject image as a reference for creating combining image data. Thus, in such a case, a predetermined mark may be formed on each of the continuously shot images for forming a combined image using the mark as a reference, so that the relative distances between the marks and the fixed pattern noises become different in each of the shot images by a given number of pixels.

The present invention can also be applied to an equipment having a built-in electronic camera, such as a mobile phone with a camera, a game machine with a camera, etc. The present invention may also be applied to a system composed of a plurality of devices, such as a host computer, an interface unit, a camera head, etc.

The object of the present invention may be achieved -in the following manner: First, a recording medium recorded with program codes of software which implement the functions of the embodiment is loaded into a system or an apparatus. The computer in the system or apparatus reads the program codes recorded on the recording medium in this case, the program codes themselves implement the functions of the embodiment and the recording medium recorded with the program codes constitutes the present invention. Here, recording media to record program codes include flexible disks, hard disks, ROMs, RAMS, magnetic tapes, nonvolatile memory cards, CD-ROMs, CD-Rs, DVDs, optical disks, and magneto optical disks (MOs). In addition, a computer network, such as a local area network (LAN) or a wide area network (WAN), can be used to provide program codes.

What is claimed is:

1. An image capture apparatus comprising:
    an image producing unit configured to shoot a subject a number of times successively with an image sensor to produce a plurality of images;
    a compensating unit configured to change a relative position of the image producing unit and an optical axis of the image producing unit such that (i) a displacement of a shooting range of the image sensor is compensated for and (ii) the shooting range of the image sensor varies for each shooting during the successive shooting of the subject; and
    a composite image forming unit configured to combine the plurality of images, having been produced with the displacement compensated for by the compensating unit, with reference to a common main subject portion in the images of the subject as a reference position for combining the images so as to create a composite image of the plurality of images having reduced fixed pattern noises.

2. The image capture apparatus according to claim 1, wherein the compensating unit includes: a first output unit configured to detect a camera-shake and output shake compensating information to compensate for the displacement in a position of the image sensor due to the camera-shake,
    a second output unit configured to output pixel shifting information to shift the position of the image sensor,
    a calculation unit configured to calculate shift information of the image sensor which reflects the shake compensating information and the pixel shifting information, and
    a shift controlling unit configured to shift the position of the image sensor in accordance with the shift information calculated by the calculation unit,
    wherein the compensating unit is configured to change the relative position of the image producing unit and the optical axis of the image producing unit by moving the image sensor via the shift controlling unit.

3. The image capture apparatus according to claim 2, wherein the second output unit is configured to output pixel shifting information to shift the image sensor in a given direction at a first-image shooting time and to output pixel shifting information to shift the image sensor in a direction opposite to the given direction at a second-image shooting time and thereafter.

4. The image capture apparatus according to claim 3, wherein the second output unit is configured to output pixel shifting information to shift the image sensor in the given direction by a first shift amount at the first-image shooting time and to output pixel shifting information to shift the image sensor in the direction opposite to the given direction by a second shift amount smaller than the first shift amount at the second-image shooting time and thereafter.

5. The image capture apparatus according to claim 4, wherein the second output unit is configured to output the pixel shifting information only at each image shooting initiation time.

6. The image capture apparatus according to claim 2, wherein the second output unit is configured to output pixel shifting information for shifting the position of the image sensor by at least a number of pixels corresponding to a pattern width of the fixed pattern noise of the images.

7. The image capture apparatus according to claim 1, further comprising an extraction unit configured to extract respective feature portions from each common main subject portion in the images of the subject produced by the image producing unit, and
    wherein the composite image forming unit is configured to combine the images with reference to the extracted feature portions extracted by the extraction unit as a reference position for combining the images to create the composite image.

8. The image capture apparatus according to claim 7, further comprising an erase unit configured to erase an image in which the main subject is not taken from among the plurality of images produced by the image producing unit, and
    wherein the composite image forming unit is configured to combine the images, excluding the erased image in which the main subject is not taken, with reference to the feature portions extracted by the extraction unit as a reference position for combining the images to create the composite image.

9. The image capture apparatus according to claim 1, wherein the composite image forming unit is configured to combine the images with reference to the common main subject portion of the images of the subject so that brightness and color difference values of the composite image are average values of brightness and color difference values of the plurality of images.

10. A non-transitory computer readable recording medium having recorded thereon a computer program that is executable by a computer provided in an image capture apparatus comprising image producing means for shooting a subject successively a number of times using an image sensor to produce a plurality of images, the computer program causing the computer to execute processes comprising:
    a compensating process of changing a relative position of the image producing means and an optical axis of the image producing means such that (i) a displacement of a shooting range of the image sensor is compensated for and (ii) the shooting range of the image sensor varies for each shooting during the successive shooting of the subject; and
    a composite image forming process of combining the plurality of images with reference to common subject portions of the images of the subject as a reference position for combining the images, having been produced with the displacement compensated for by the compensating process, to create a composite image of the produced plurality of images having reduced fixed pattern noises.

* * * * *